United States Patent
Beck et al.

(10) Patent No.: US 10,449,738 B2
(45) Date of Patent: Oct. 22, 2019

(54) METHOD FOR PRODUCING SOLIDIFIED FIBER BUNDLES

(71) Applicant: SGL CARBON SE, Wiesbaden (DE)

(72) Inventors: Rudi Beck, Moenchsdeggingen (DE); Florian Gojny, Kelkheim (DE); Frank Kochems, Wertingen (DE); Konrad Maier, Kaisheim (DE)

(73) Assignee: SGL Carbon SE, Wiesbaden (DE)

( * ) Notice: Subject to any disclaimer, the term of this patent is extended or adjusted under 35 U.S.C. 154(b) by 0 days.

(21) Appl. No.: 15/943,882

(22) Filed: Apr. 3, 2018

(65) Prior Publication Data

US 2018/0222134 A1 Aug. 9, 2018

Related U.S. Application Data

(62) Division of application No. 14/238,516, filed as application No. PCT/EP2012/065683 on Aug. 10, 2012, now abandoned.

(30) Foreign Application Priority Data

Aug. 12, 2011 (DE) .......... 10 2011 080 917
Aug. 19, 2011 (DE) .......... 10 2011 081 263

(51) Int. Cl.
*B29B 15/12* (2006.01)
*B29C 70/50* (2006.01)
(Continued)

(52) U.S. Cl.
CPC .......... *B29C 70/82* (2013.01); *B29B 15/122* (2013.01); *B29C 70/504* (2013.01); *C04B 35/573* (2013.01); *C04B 35/589* (2013.01);
*C04B 35/6269* (2013.01); *C04B 35/806* (2013.01); *C04B 35/83* (2013.01); *D04H 3/002* (2013.01); *D04H 3/02* (2013.01); *D04H 3/04* (2013.01);
(Continued)

(58) Field of Classification Search
None
See application file for complete search history.

(56) References Cited

U.S. PATENT DOCUMENTS 5,208,090 A * 5/1993 Okitsu ............... B29C 70/20
428/113
5,571,356 A 11/1996 Skaletz et al.
(Continued)

*Primary Examiner* — Jose Hernandez-Diaz
(74) *Attorney, Agent, or Firm* — Laurence A. Greenberg; Werner H. Stemer; Ralph E. Locher

(57) ABSTRACT

A method for producing solidified fiber bundles includes applying a melt or solution to a carrier web forming a viscous coating, applying parallel filaments under tension to the carrier web, and pressing the filaments into the viscous coating, forming an impregnate. The coating is partially solidified until a plastically deformable state of the impregnate is obtained by vaporizing the solvent, thermal curing and/or cooling. The impregnate is rolled onto a winding core to form a roll while maintaining a winding tension of the filaments in the impregnate. The outer roll is fixed on the winding core by a sleeve and/or by adhesive tape. The impregnate is solidified by vaporizing the solvent, thermal curing and/or cooling. The solidified impregnate is divided up to form solidified fiber bundles. A pressure produced by the winding tension of the filaments in the impregnate is exerted on the roll.

9 Claims, 1 Drawing Sheet

(51) Int. Cl.

| | | |
|---|---|---|
| *B29C 70/82* | (2006.01) | |
| *C04B 35/80* | (2006.01) | |
| *C04B 35/83* | (2006.01) | |
| *D04H 3/002* | (2012.01) | |
| *D04H 3/02* | (2006.01) | |
| *D04H 3/04* | (2012.01) | |
| *D04H 3/12* | (2006.01) | |
| *C04B 35/573* | (2006.01) | |
| *C04B 35/589* | (2006.01) | |
| *C04B 35/626* | (2006.01) | |
| *B29K 61/00* | (2006.01) | |
| *B29K 307/04* | (2006.01) | |
| *B29L 9/00* | (2006.01) | |

(52) U.S. Cl.
CPC ........... *D04H 3/12* (2013.01); *B29K 2061/00* (2013.01); *B29K 2307/04* (2013.01); *B29L 2009/005* (2013.01); *C04B 2235/428* (2013.01); *C04B 2235/483* (2013.01); *C04B 2235/486* (2013.01); *C04B 2235/524* (2013.01); *C04B 2235/526* (2013.01); *C04B 2235/5244* (2013.01); *C04B 2235/5248* (2013.01); *C04B 2235/5256* (2013.01); *C04B 2235/5264* (2013.01); *C04B 2235/616* (2013.01); *Y10T 428/2936* (2015.01)

(56) References Cited

U.S. PATENT DOCUMENTS

| | | |
|---|---|---|
| 8,603,374 B2 | 12/2013 | Domagalski et al. |
| 2004/0062858 A1* | 4/2004 | Sato .................... B29B 15/122 174/257 |
| 2006/0076699 A1* | 4/2006 | Domagalski ............... C08J 5/04 264/29.2 |
| 2007/0283660 A1 | 12/2007 | Blahut |
| 2010/0266247 A1 | 10/2010 | Willemsen et al. |

* cited by examiner

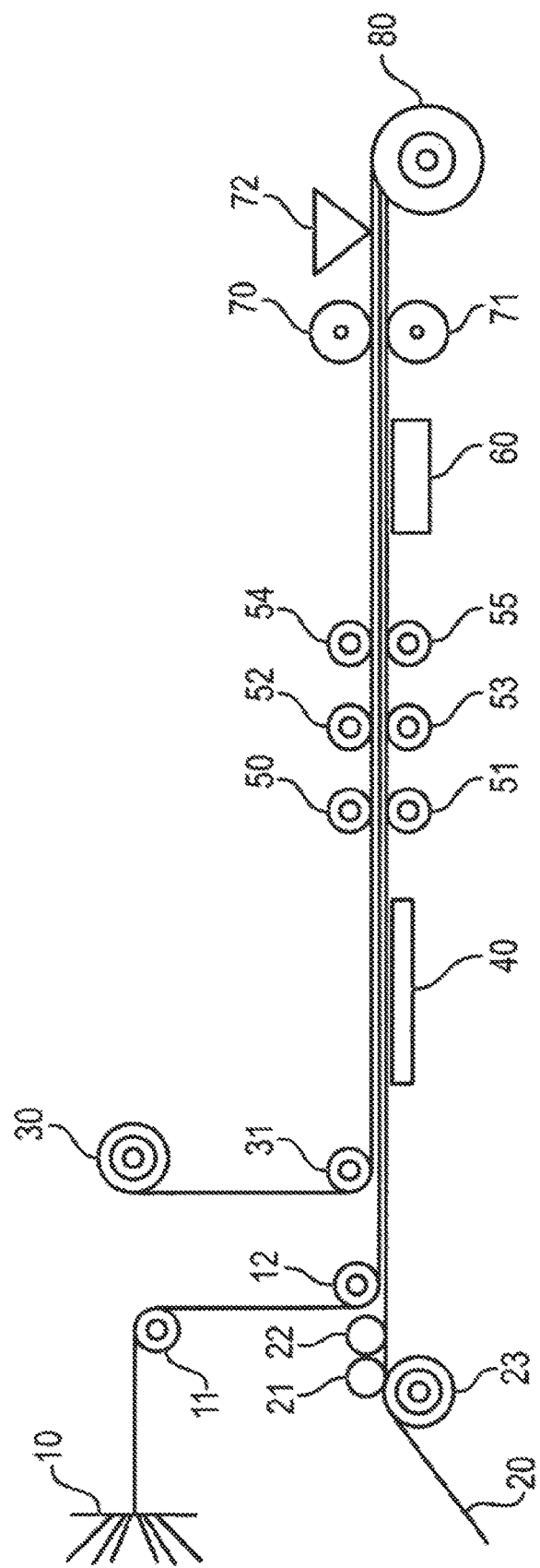

METHOD FOR PRODUCING SOLIDIFIED FIBER BUNDLES

CROSS-REFERENCE TO RELATED APPLICATION

This application is a divisional of patent application Ser. No. 14/238,516, filed Jun. 18, 2014; which was a § 371 national stage filing of international application No. PCT/EP2012/065683, filed Aug. 10, 2012, which designated the United States; this application also claims the priority, under 35 U.S.C. § 119, of German patent applications No. DE 10 2011 081 263.6, filed Aug. 19, 2011, and No. DE 10 2011 080 917.1, filed Aug. 12, 2011; the prior applications are herewith incorporated by reference in their entirety.

BACKGROUND OF THE INVENTION

Field of the Invention

The invention relates to solidified fiber bundles, a production method therefor and use thereof in the manufacture of composite materials.

Polymer-bonded fiber fabrics produced by impregnating a thread of yarn by drawing said yarn thread through a bath containing a resin solution or molten resin (of a thermosetting or heat-curable polymer), or a thermoplastic, and subsequently compressing the impregnated yarn thread and cutting the flattened yarn thread in the lengthwise and crosswise directions are known from European Patent Application No. 1 645 671 A1 (corresponding to U.S. Pat. No. 8,663,374).

In this process, with appropriate cutting equipment it is possible to ensure a high degree of uniformity in terms of the length (measured as the average spatial extension of the fiber bundles parallel to the average vector in the direction of the lengthwise extension of the fibers in the fiber bundle in question) and the width (measured as the average of the larger spatial extension in each case of the fiber bundles perpendicular to the average vector in the direction of the lengthwise extension of the fibers in the fiber bundle in question) of the fiber bundles created during the cutting steps. However, in the tests that led to the present invention, it was discovered that the fiber bundles created in this way tend to disintegrate in a subsequent mixing process for producing fiber-reinforced plastics or fiber-reinforced resins, and although the length of the fiber bundles changes little or not at all, the width thereof, that is to say their extension perpendicular to the direction of the fibers, shrinks significantly. This disintegration occurs not only when they are mixed with particulate solids such as thermoplastics, thermosetting resins, filler materials, but also with liquid resins or pitches, and also with any of said solid and liquid substances in any combination, and is particularly pronounced when they are mixed with solids in the powder form.

BRIEF SUMMARY OF THE INVENTION

In view of the above, the object was to produce such solidified fiber bundles having improved strength in such manner that they disintegrate only insignificantly or not at all when mixed with the aforementioned substances. A further object was to suggest a production method that enables such solidified fiber bundles to be manufactured efficiently and inexpensively. Yet another object may be considered to be to improve the positioning requirements to which the impregnated precursor materials of the fiber bundles are subject, so that in particular their positioning may require less space.

These objects were solved with a continuous process for manufacturing solidified fiber bundles comprising the steps of a) applying a melt or solution to a sheet-like carrier layer, thereby forming a viscous coating, b) applying parallel filaments under tension to said carrier layer coated in this way, c) pressing the filaments into the viscous coating, thereby forming an impregnate, d) optionally, partially solidifying the coating until a plastically deformable state of the impregnate is obtained by at least one of the steps comprising vaporizing the solvent, thermal curing and cooling, wherein these steps are only performed to the extent that a plastically deformable state is maintained, wherein in particular a force is exerted directly or indirectly on the impregnate by at least one pressure application device during or after solidification of the coating, e) rolling the impregnate onto a winding core to form a roll while maintaining a winding tension of the filaments in the impregnate, f) optionally, fixing the roll on the winding core by means of at least one sleeve and/or at least one adhesive tape, g) solidifying the impregnate by at least one of the steps comprising vaporising the solvent, thermal curing and cooling, and h) dividing up the solidified impregnate, in particular in parallel and perpendicularly to the direction of the filaments to form solidified fiber bundles, wherein a pressure produced by the winding tension of the filaments in the impregnate is exerted on the roll during the performance of step g).

The stated objects were further solved by solidified fiber bundles that are obtainable by the application of such a method.

Here and in the following, the term impregnate is understood to mean an arrangement of filaments or fibers of which at least some have undergone impregnation. Accordingly, complete impregnation for the purposes of complete coating of the filaments or fibers is not necessary.

In detail, the method according to the invention involves first applying a melt or solution, preferably a polymer melt or a polymer solution to a sheet-like carrier layer, preferably a film or a paper web, in the form of a viscous coating, wherein the mass of the applied substance per unit of area is preferably 80 g/m$^2$ to 400 g/m$^2$, particularly preferably 100 g/m$^2$ to 200 g/m$^2$. If a melt is used, such melt is preferably of a thermosetting plastic or of a thermosetting synthetic resin or of a pitch or of a sugar. If a solution is used, such a solution is preferably of a thermosetting plastic or of a thermosetting synthetic resin or of a pitch or of a sugar.

Filaments arranged parallel with each other, possibly enclosed in a fabric, are deposited under tension on said carrier layer coated in this manner, for example by a warping device, and the filaments are subsequently pressed into the viscous coating, and thus bonded therewith, for example by passing between a pair of calendar rolls. If the coating material is a synthetic resin, that is to say a duroplast, said coating material is at least partly cured, optionally in a heating device by vaporisation of the solvent and/or by a crosslinking reaction of the duroplast, during the subsequent passage of the multilayered structure, consisting of a carrier layer with a coating in which filaments arranged parallel to each other and aligned in the direction of transport are embedded in a melt or a viscous solution. In a preferred variant, after exiting the heating a top cover may be added on the side opposite the carrier layer side before a second pair of rollers, which top cover adheres to the coating, which is normally still deformable and viscous, that is to say still suitable for impregnation. The bonded filament layer thus created, which may be covered or uncovered, and is applied to the carrier layer, may then preferably be advanced over a cooling table. Then, it may either be rolled up directly onto a winding core, or preferably first cut into narrower individual webs in the lengthwise direction of the filaments in a cutting device, that is to say divided up according to the desired width of the fiber bundles that are to be produced. In both cases, the webs are then wound onto winding cores or reels. Cardboard tubes, having a diameter of 300 mm for example, are preferably used as the winding cores. In this case, the filaments retain a predefined winding tension, which further helps to hold the webs together in the winding. The winding tension is created due to the fact that a tension is applied to the fiber bundles during the winding process, that is to say the fiber bundles are wound onto the winding cores under tension. The winding tension is also supported by the strength of the impregnate, which results from the tension that is applied to the filaments while they are deposited under tension on the coated carrier layer to create the impregnate.

The division according to the desired width of the fiber bundles may be carried out either before or not until after a fixing step, which is described as optional, and before or also after a curing step, which will be described in the following. In the latter case, the entire filament layer bonded with the carrier layer is rolled up at full width.

If the bonded filament layer applied to the carrier layer is divided before the optional fixing step and/or the curing step, the top cover is preferably placed thereon after said dividing step, in which case it has an overhang of at least 1 mm, preferably at least 2 mm, and particularly at least 5 mm, on each side of the carrier layer over the width of the partial web. In this case, winding is carried out in such manner that the side of the partial web with the top cover faces inward, hat is to say towards the reel body.

According to the experiments carried out as part of the present invention, the method step which then follows, in which the windings thus created are optionally fixed and solidified, results in improved stability of the fiber bundles. The carrier layer with the coated filament layer, that is to say the impregnate (hereafter also referred to as "prepreg") is wound onto the reels or winding cores at the desired length, optionally fixed with a sleeve or with thermally resistant adhesive tape, and if thermoplastics or other meltable substances are used, is cooled to below the melting temperature thereof, or if thermosetting, duroplastic substances are used, it is transported into a heating device to cure the thermosetting layer, in which case the suitable temperature range and required dwell time may be adjusted depending on the type and mass of the synthetic resin or duroplast. If a furnace is used, the heating device for curing is preferably operated in recirculated air mode, other heating options, such as microwave heating, infrared heating or induction heating for conductive carbon filaments, may also be used. The curing conditions such as temperature and dwell time are normally dependent on the mass of the material to be cured, the energy input from the heating device, and the chemical composition (reactivity) of the thermosetting substance. Of course, a continuous operating mode, with a continuous pass furnace for example, is also possible here.

The critical feature in this context is that pressure must be exerted on the winding that is to be hardened, during curing (in the case of duroplasts) or during cooling (in the case of thermoplasts). This pressure is created by the winding tension of the filaments in the impregnate, and according to a preferred embodiment is maintained by fixing the windings with a sleeve or adhesive tape. In the case of carbon filaments that are bonded with synthetic resins, that is to say duroplasts, the force exerted on the windings is preferably in the order of 10 N to 1,500 N, particularly preferably 100 N to 1,000 N, most preferably 450 N to 800 N. For a reel having a length of 500 mm and a core diameter of 300 mm, this corresponds to a pressure on the outside surface of 0.5 kPa to 2 kPa. In order to achieve the adhesion between the filaments and the matrix necessary to enable further processing, it is essential that pressure of this magnitude be maintained. In particular, the winding tension must be selected such that at least a pressure of 0.5 kPa, preferably at least 1.0 kPa is created.

If duroplasts or mixtures containing duroplasts are used, raising the temperature in the heating device causes said materials to soften, and the winding tension created by the force described in the preceding sets a flowing process in motion, which further improves the evenness of the impregnation and wetting of the filaments with the impregnating agent. This homogeneous structure is fixed by the subsequent curing.

If the filaments are bonded with thermoplasts or other meltable substances, such as pitches, it is sufficient to cool and solidify them, also with pressure on the winding. It has been discovered that mixtures containing a percentage by mass of at least 30% of a thermosetting, that is to say a duroplastic substance, can be cured by the effect of heat It has been discovered that mixtures can be cured by the effect of heat, although the lower limit depends on the type of the duroplast and of the other substances contained in the mixture. For example, mixtures of phenolic resins and pitches having a mass percentage of at least 30% phenolic resins are also thermosettable, although curing agents are added in the case of novolaks, something that is not necessary when phenol-resol resins are used.

According to one of the embodiments described in the preceding, filament strips are produced using said windings (cured or hardened by cooling) by lengthwise cutting, that is to say parallel to the alignment of the filaments, or filament strips are unrolled from the reels or windings, and in both cases the solidified filament strips are then forwarded to a transverse cutting device, in which they are cut to the desired length (perpendicularly to the direction of the filaments), and so form the desired fiber bundles.

After curing, the process webs, that is to say the papers of films serving as the carrier layer or top cover, may be removed from the cured, bonded filament layers by rewinding, as was done in the following application example. In this way, the carrier layers and top covers can be recycled or downcycled. Alternatively, the carrier layers and top covers may be removed in the following process step during further processing. If the carrier layer and top cover are divided together with the cured prepreg, they can also be left in the product as aggregate.

The width of the filament strips, obtained by dividing in the lengthwise direction—that is the direct of the filament alignment —, is between 0.1 mm and up to 20 mm, and is preferably in the range from 0.5 mm to 3 mm. Cutting to size in the transverse direction, that is to say perpendicularly to the direction of the filaments or fibers, is carried out in a cutting and/or punching process, and yields the desired, solidified fiber bundles. The length thereof may be in a range for example from 2 mm to 50 mm, and is preferably from 3 mm to 20 mm.

As usual, the term filaments is used to denote endless (i.e., the length of which is only limited by the capacity of the reels) single strands or multiple parallel strands; in this context, the term fibers is used to denote single or multiple mainly parallel strands having limited length, wherein in the case of synthetically produced fibers the lengths are usually determined by a cutting process.

After the solidified windings have been cooled and cut, hard, that is to say dimensionally stable, bonded fiber layers remain, referred to as cured prepregs. The length and width of these cured prepreg cut lengths are defined by the cutting operations during the manufacture thereof.

These solidified fiber bundles comprise fibers aligned in parallel, embedded in a solid matrix, particularly a thermoplast or synthetic resin matrix, wherein the matrix is solidified by cooling to below the melting or glass transition temperatures (for thermoplasts) or by curing (for synthetic resins or duroplasts).

Due to the solidification and the rolling up onto a winding core, the solidified, impregnated fiber layers also have a curvature, which in turn causes curvature in the solidified fiber bundles. Accordingly, the solidified fiber bundles may also have a curvature that is discernible with the naked eye, in some cases even when they have been unrolled from the winding body and cut or stamped. This curvature may be reduced or even eliminated entirely by a subsequent smoothing process, carried out for example with a smoothing device integrated in a cutting device, or by mechanical stretching after unrolling from the winding.

Solidified fiber bundles of such kind may be used preferably for producing fiber-reinforced ceramic materials, particularly for producing C/SiC materials, which today are used particularly for brake and clutch discs. Other applications include reinforcing elements in synthetic carbon materials, for electrodes in smelting furnaces for example, or in electrolysis applications, for reinforcing concrete or in the reinforcement of materials for antiballistic protection equipment.

These solidified fiber bundles are notable for the following properties:

very low fluctuations in the mass per unit area and mass percentage per unit area of the fibers, also in the resin content and the low crack formation over the full width thereof, mass percentage per unit area of the fibers in the fiber bundles is in the range from 50 g/m2 up to 800 g/m2, preferably from 100 g/m2 to 350 g/m2, and particularly from 200 g/m2 to 300 g/m2, the resin content can be adjusted with an accuracy of ±3%, and not more than ±5%, with a mass percentage of 40% synthetic resin and a mass percentage per unit area of 400 g/m2 for the impregnate; without the step of curing under tension, the fluctuation range is ±15%, improved flowability in the cut state: during measured delivery via shaking channels, no clustering or clumping occurs, the shaking angle is about one half smaller than prepreg cut lengths with the same length and width distribution but which are manufactured without the step of curing under tension, lower mass percentage of dusts, less than 1%, particularly fine dusts and aerosols, during cutting and in the cut state, high cutting/shearing strength (cross-sectional splitting force) within the impregnated and solidified prepreg cut sections or fiber bundles, from 70 MPa to 150 MPa in the solidified and cured state (with bundles according to the prior art, as represented by patent application EP 1 645 671 A1, values from only about 35 MPa to about 55 MPa were achieved), and uniform impregnation of the fiber bundles, resulting in a high tapped density, in the case of carbon filaments bonded with phenolic resin, tapped density values are achievable that are 20% to 25% higher than without the step of curing under tension.

Raw materials for the fiber bundles according to the invention may preferably be filaments made from carbon, ceramic materials such as silicon carbide, silicon nitride, silicon carbonitride, silicon boron carbonitride, which are obtainable in known manner by pyrolysis of silicon-organic polymers, from aromatic polyamides (aramides), from thermotropic liquid crystalline polymers, particularly aromatic copolyesters on a hydroxybenzoic acid or hydroxynaphthoic acid basis, from glass and even thin metal wires. Particularly preferred are filaments made from carbon. The material for the bonding agent or the matrix is preferably a polymer, which may be thermosetting or thermoplastic. It is also possible to use low-molecular organic substances, which are applied as a melt like thermoplasts and lend sufficient strength to the fiber bundles in the cooled state, such as for example pitches and/or sugars. The "preceramic" polymers are also usable, stabilising the fiber bundles in the cured state, and which, when used, cause the fiber bundles to be converted to a ceramic phase by thermal treatment after cutting and incorporation in a material, such polymers particularly including polysilazanes, polyborosilazanes, polycarbosilazanes, and polyborocarbosilazanes, which can be converted to silicon nitride, silicon boronitride, silicon carbonitride, and silicon borocarbonitride. These reinforcing fibers are aligned parallel within the fiber bundles and are present in a matrix of polymers (for example phenolic, epoxy, cyanate ester, polyester, vinyl ester, benzoxazine resin or mixtures of such resins, which contain a percentage by mass of at least 10% of one of the cited components), or thermoplastic materials (e.g., pitches, polyimides, polyetherimides, polyam ides, polyketones), the preceramic polymers cited previously, carbon or ceramic materials (for example CSiC, that is to say carbon-fiber reinforced silicon carbide). In addition, the polymers listed previously may also contain fillers such as carbon blacks, graphites or nanoparticles (for example carbon nanotubes, carbon nanofibers). A viscous solution of a phenolic resin is particularly preferred for use as the bonding agent.

The fiber bundles produced in this manner may also be used to strengthen thermoplastic or thermosetting plastics, the fiber bundles preferably being mixed with powders or a granulate of the plastics concerned as the matrix material and then being reshaped by compressing for example. The fiber bundles according to the invention may also be mixed with the matrix material in a kneader (for example a Z-arm kneader with intermittent operation) or in a worm extruder (extruder with continuous operation), possible with the addition of the fillers cited in the preceding. The addition of the solidified fiber bundles according to the invention results in considerable improvement to the strength and rigidity of the moulded parts manufactured therefrom.

BRIEF DESCRIPTION OF THE DRAWING

The FIGURE of the drawing is a diagrammatic, illustration of a plant that is suitable for a method for producing solidified fiber bundles according to the invention.

DESCRIPTION OF THE INVENTION

Referring now to the single FIGURE of the drawing in detail, there is shown a plant for producing windings that according to the invention are rolled up while under tension, and are solidified by thermal curing (in the case of thermosetting binders) of by cooling (in the case of thermoplastic binders, i.e., binders that soften with heat) with the application of traction and the pressure generated thereby.

A warping device is designated by 10, and from the warping device a warp of parallel filaments issues in a uniform layer thickness over the entire width of the warp and passes over a roll pair 11 and 12. A carrier layer 20 comes from an unwinding unit—not shown in further detail—and passes over a pressure roller 23 to a roll pair 21, 22. The outer surfaces of rolls 21, 22 define a narrow gap, the thickness of which may be altered by shifting the axes of these two rolls relative to one another, wherein a bonding agent in liquid form is poured between the two rolls from above. In this context, the viscosity of the bonding agent is selected such that it is able to be applied through the gap between the rolls, and the binding agent does not run off of the carrier layer, simply forming a coat thereon. In a preferred embodiment, the two rolls 21 and 22 can be heated, so that a constant viscosity of the binding agent may be assured via a regulating device with continuous viscosity measurement and temperature control. When the two rolls are counter-rotated with respect to one another, an even film of the bonding agent is spread over the carrier layer from above. In a preferred embodiment, roll 22 is not rotated and roll 21 is rotated in such manner that the outer surface thereof that is close to the carrier layer rotates in the opposite direction to the transport direction of the carrier layer. In this way, it is possible to apply a film of bonding agent to the carrier layer as evenly as possible. The filament warp is pressed into the bonding agent layer on the carrier layer 20 by roll 12. In a particular embodiment, after this step a further web from a roll 30 may be spread as a top cover over the filament warp impregnated with bonding agent from above via a deflection roller 31. Then, the "impregnate" consisting of carrier layer 20 and the filament warp soaked with the bonding agent, possibly with the applied top cover drawn from roll 30 is guided through a heating device, for example a heating table 40 as shown here, with surface contact with the impregnate from below, that is to say the side of the carrier layer, or an infrared heater from above, or in a hot air tunnel with lengthwise or transverse airflow, is smoothed from top to bottom with pressure by preferably at least one roll pair 50 and 51 (shown in the FIGURE as three roll pairs 50 and 51, 52 and 53, and 54 and 55), the at least one roll pair preferably being designed so as to be heatable as well, then optionally through a cooling apparatus, represented here as a cooling table 60, guided between rolls 70 and 71 that are implemented as the main drive, and through a apparatus 72 for measuring the mass per unit of area, and finally rolled up on a wind-up reel 80. Normally, the winding device is constructed with wind-up reel 80 in such manner that reels can be changed automatically, thus enabling the system to continue operating without interruption.

It is preferred to use a solution or a melt of an organic substance in step a), and the solidified fiber bundles are treated at a temperature from 750° C. to 1300° C. in the absence of oxidising agents after step h), thereby converting at least some of the organic substance into carbon. In this way, fiber bundles may be produced that, when filaments of carbon are used, consist of porous carbon reinforced with carbon fibers. Suitable fibers are then obtained by cutting (dividing) the filaments perpendicularly to the direction of the filaments.

The solidified fiber bundles produced according to the invention are preferably used as reinforcing elements for thermoplastic materials or for thermosetting resins. Such thermoplastics or thermosetting synthetic resins reinforced with the solidified carbon fiber bundles produced according to the invention may be treated at a temperature of 750° C. to 1,300° C. in the absence of oxidising agents, in which case at least a part of the thermoplastic materials or thermosetting synthetic resins is converted to carbon by carbonisation. If moulded bodies from such thermoplastics or thermosetting synthetic resins reinforced with the solidified carbon fiber bundles produced according to the invention are treated at a temperature from 750° C. to 1,300° C. in the absence of oxidising agents, wherein at least a part of the thermoplastic materials or thermosetting synthetic resins is converted to carbon by carbonisation, and the carbonised moulded bodies obtained thereby are subsequently treated by infiltration with liquid or gas-phase, carbide-forming elements above the melting or vaporisation temperature thereof to form carbides of such elements, moulded bodies are produced that contain carbon fibers as reinforcing elements, and of which the matrix contains carbides of the elements used for infiltration, possibly as well as unconverted residues of the carbon formed by the carbonisation and/or of the elements used for infiltration. If silicon is used as a carbide-forming element, moulded bodies made from CSiC are obtained, that is to say made from silicon carbide reinforced with carbon fibers, the matrix of which also still contains residues of unconverted carbon and/or unconverted silicon.

It is particularly advantageous to use mixtures of thermosetting synthetic resins with at least one further component selected from pitches and particulate carbon as the bonding agent.

The invention will be explained in greater detail in the following example. The method described comprises several substeps, which together yield the fiber bundles according to the invention.

1 Production of Prepregs

A unidirectional prepreg was produced, wherein first a liquid phenol-resol resin (percentage by mass of substances that are non-volatile for 60 minutes at 135° C., approximately 71%, viscosity determined according to Höppler at 20° C. in accordance with ISO 9371: 750 mPa s, ©Norsophen 1203, Hexion Specialty Chemicals) was applied to a web of paper coated with silicon and having a width of 1,100 mm serving as the carrier layer. The mass per unit of area of the carrier layer was 90 g/m$^2$, the thickness of the coated paper was 0.07 mm. The resin application quantity was adjusted such that a resin mass per unit of area of 190 g/m$^2$ with a variation margin of up to ±3% was created in the prepreg. Spatially spread 50 k carbon filaments (©Sigrafil C30 T050 EPY, SGL Carbon SE, approximately 50,000 filaments per bundle) with a single filament thickness of about 7 μm were added all at once at a distance of 1,800 mm after the resin application, and the addition of the carbon filaments caused the mass per unit of area to rise by 285 g/m$^2$ (with the same variation margin of ±3%). The filament layer impregnated with resin on the carrier layer was approximately 1,020 mm wide.

The material was prepolymerized with a line speed of 3.2 m/min in a furnace with heating table and full surface contact at 180° C., wherein the viscosity was lowered by the raised temperature to the extent that the resin penetrated the filament stands.

After passing through the heating apparatus, the compacting and compression steps followed in a roll pair functioning as a calendar, thus forming a bead of the resin in front of the roll gap, which rendered the prepreg more even and enabled the resin to penetrate the filament structure. In this context, the heated rolls were set to a temperature of 100° C.

In this case, it had proven beneficial to delay the application of the top cover until after the heating table was passed, but before passing through the first roll pair, functioning as a calendar, because this allowed solvents and other volatile substances to escape from the filament web impregnated with resin. The same silicon-coated paper was used for the top cover as for the carrier layer. The pressure applied by the roll pair was set to 9.8 kN by adjusting the pressing force. In this way, an even resin bead was created, and therewith also a homogeneous, visibly closed prepreg.

In another experiment, it was found that the selection of a defined roller gap, in this case 0.52 mm, and minor adjustment of the mass per unit of area by altering the roller gap with a maximum pressing force of 39.2 kN on the spacers of the gap calendar roll adjustment results in more even mass distribution of the prepreg.

The impregnate consisting of top cover, prepreg and carrier layer was then passed over a cooling table that had been set to 30° C., with the selected line speed, this caused the impregnate to cool to a temperature of about 41° C. in the core.

The impregnate was guided to the winding apparatus via a further roll pair which functions as that main drive unit, and the cited low variations in the mass per quantity unit were achieved through continuous measurement of the area weight coupled with the operating mode of the calender and of the resin application system.

The impregnate was rolled up onto cardboard cylinders having an external diameter of 300 mm as the winding core and with a tractive force of 600 N. The winding core was changed after every 150 m of winding length; the completed windings were fixed by banding with thermally stable adhesive tape and then removed and placed in storage with a manipulation arm.

The mass content of (precured) resin in the finished impregnate was 41.5%, with a mass percentage of 5.5% volatile components.

2 Curing the Impregnate

Four such rolls were each arranged in a frame of 2×2 slots, and dried and hardened together in a circulating air oven. The following temperature programme was maintained:

Heat up from room temperature (23° C.) to 180° C. with a heating rate of 6° C./min, Maintain at 180° C. for 150 min, Cool down from 180° C. to 40° C. within 60 min On these cured impregnates, a residual moisture corresponding to a mass percentage of about 2.8% was measured.

3 Cutting and Stamping

The cured impregnates were rewound, so that the top cover, carrier layer and the cured prepreg were rolled up separately from each other. Then, the rolls with the cured prepregs were cut into sub-rolls with a width of 40 mm with a rotating knife on a roll cutting machine. As a result of the "displacement cut" used to divide the partial rolls, the mass percentage of material lost in this work step was less than 0.2%.

The cured prepreg strips thus obtained were cut in a stamping apparatus into solidified fiber bundles called "rods", 90% of which were within the specified parameters for length and width, in this case with a width between 0.8 mm and 1.1 mm, and with length between 9.0 mm and 13.5 mm. These percentages of specification-conforming values for length and width of the rods under identical stamping conditions are 9% better for length and 17% better for width than the polymer bonded fiber fabrics produced according to patent application EP 1 645 671 A1.

The rods obtained were dispensed in metered quantities via vibrating troughs and hoppers without problems or clogging.

The cutting/shearing strength was measured on rods having dimensions 50 mm×100 mm, and was in the order of 121 MPa. The cutting/shearing strength is about 110% greater than that of the polymer bonded fiber fabrics produced according to patent application EP 1 645 671 A1.

Compared with the polymer-bonded fiber fabrics produced according to application EP 1 645 671 A1, the total area of unimpregnated portions in the cross section between individual filaments in the rods produced according to the present invention is at least 20% lower than in the rods having the same dimensions. This was verified by imaging analysis of pictures of sections through said rods that had been captured with a light microscope and enlarged with and electron microscope.

Further comparative experiments were conducted on rods according to the example of this application and rods according to application EP 1 645 671 A1, and the rods were treated at 900° C. in the absence of oxidising agents until constant weight was reached, wherein the cured phenolic resin (used identically in both cases) was converted into a porous carbon matrix. The porosities of the rods were compared, and the porosity of the carbonised rods according to the present invention was measured at 28%, the porosity in the rods according to application EP 1 645 671 A1 was found to be 45%. The greater the density of the resin matrix, the less the measured porosity is after carbonisation. This also shows on a quantitative scale that the method according to the present invention results in the better impregnation.

REFERENCE SIGNS

10 Fiber feed
11, 12 Deflection rollers
20 Carrier layer
21 Application roller
22 Fixed roller
23 Deflection roller for carrier layer
30 Top cover
31 Deflection roller for top cover
40 Heating table
50, 51, 52, 53, 54, 55 Roller set
60 Cooling table
70, 71 Take-up rollers (main drive)
72 Mass per area quantity unit measurement device
80 Winding

The invention claimed is:

1. A method for producing solidified fiber bundles, which comprises the steps of:
 a) applying a melt or solution to a sheet-shaped carrier layer, thereby forming a viscous coating;
 b) applying parallel filaments under tension to the sheet-shaped carrier layer having the viscous coating;
 c) pressing the filaments into the viscous coating, thereby forming an impregnate;

d) rolling the impregnate onto a winding core to form a roll while maintaining a winding tension of the filaments in the impregnate;

e) solidifying the impregnate by at least one of vaporizing a solvent, thermal curing and cooling resulting in a solidified impregnate, wherein a pressure produced by the winding tension of the filaments in the impregnate is exerted on the roll during a performance of step e); and f) dividing up the solidified impregnate to form the solidified fiber bundles.

2. The method according to claim 1, wherein the melt is a melt of a thermoplastic plastic, a thermosetting synthetic resin, a pitch and/or a sugar.

3. The method according to claim 1, wherein the solution is a solution of a thermoplastic plastic, a thermosetting synthetic resin, a phenolic resin, a pitch and/or a sugar.

4. The method according to claim 1, which further comprises dividing the impregnate into strips before performing the rolling step by cutting parallel to a filament direction with a cutting device.

5. The method according to claim 1, which further comprises dividing the solidified impregnate into sub-rolls by cutting parallel to a filament direction with a cutting device before performing step f).

6. The method according to claim 1, which further comprises covering the impregnate with a top cover immediately after performing step c).

7. The method according to claim 1, wherein the filaments contain carbon filaments.

8. The method according to claim 1, which further comprises:
providing the solution or the melt as a solution or melt of an organic substance in step a); and
treating the solidified fiber bundles at a temperature from 750° C. to 1300° C. in an absence of oxidizing agents after step f), thereby converting at least some of the organic substance into carbon.

9. The method according to claim 1, which further comprises:
partially solidifying the viscous coating after step c) until a plastically deformable state of the impregnate is obtained by vaporizing the solvent, thermal curing and/or cooling, wherein the vaporizing, the thermal curing and/or the cooling are only performed to an extent that a plastically deformable state is maintained, wherein a force is exerted directly or indirectly on the impregnate by a pressure application device during or after solidification of the viscous coating;
fixing the roll on the winding core after step d) by at least one sleeve and/or at least one adhesive tape; and
dividing up the solidified impregnate in step f) in parallel and perpendicularly to the direction of the filaments for forming the solidified fiber bundles.

* * * * *